(12) United States Patent
Raman et al.

(10) Patent No.: US 9,070,305 B1
(45) Date of Patent: Jun. 30, 2015

(54) TRAFFIC LIGHT DETECTING SYSTEM AND METHOD

(75) Inventors: Tiruvilwamalai Venkatraman Raman, San Jose, CA (US); Charles L. Chen, San Jose, CA (US); Anthony Scott Levandowski, Berkeley, CA (US)

(73) Assignee: Google Inc., Mountain View, CA (US)

( * ) Notice: Subject to any disclaimer, the term of this patent is extended or adjusted under 35 U.S.C. 154(b) by 973 days.

(21) Appl. No.: 13/011,036

(22) Filed: Jan. 21, 2011

Related U.S. Application Data

(60) Provisional application No. 61/297,455, filed on Jan. 22, 2010.

(51) Int. Cl.

| | | |
|---|---|---|
| *G08G 1/095* | (2006.01) | |
| *G08G 1/00* | (2006.01) | |
| *G08G 1/16* | (2006.01) | |
| *G08G 1/123* | (2006.01) | |
| *G05D 1/00* | (2006.01) | |
| *G01C 22/00* | (2006.01) | |
| *G09B 21/00* | (2006.01) | |
| *H04W 4/02* | (2009.01) | |
| *H04M 1/725* | (2006.01) | |
| *G06K 9/00* | (2006.01) | |
| *G06K 9/32* | (2006.01) | |

(52) U.S. Cl.
CPC .............. *G09B 21/001* (2013.01); *H04W 4/026* (2013.01); *H04M 1/72572* (2013.01);
(Continued)

(58) Field of Classification Search
CPC .............. B06R 2300/00; B06R 25/33; B60W 2550/30; B60W 2720/00; B60W 2550/402; G01C 19/00; G01C 21/10; G01C 21/34; G01C 21/3492; G01C 17/00; G01C 21/3647; G01C 21/3629; G01C 21/3635; G01C 21/3655; G01C 21/3658; G01C 21/3667; G01C 21/3676; G01C 21/343; G01C 21/3453; G01C 21/3605; G01C 21/28; G01C 1/20; G01C 21/3644; G01C 21/165; G08G 1/00; G08G 1/07; G08G 1/087; G08G 1/097; G08G 7/00; G08G 1/095; G08G 1/09623; G08G 1/0965; G08G 1/0969; G08G 1/096833; G08G 1/096855; G08G 1/096877; G08G 1/123; G08G 1/137; G08G 1/205; G08G 1/096872; G08G 1/09626; G08G 1/093; G08G 1/056; G08G 1/082; G08G 1/005; G08G 1/081; G08G 1/0962; G08G 1/20; G08G 1/096827; G08G 1/096844; G08G 1/164; G05D 2201/02; G05D 25/00; G05D 1/0246; G05D 1/0278; G05D 1/027; G01S 19/52
USPC ............ 340/944, 995.1, 995.13, 995.24, 996, 340/438, 425.5, 937, 995, 988, 693.1, 340/693.3, 902, 904, 903, 907, 901, 919, 340/918, 990; 701/209, 207, 210, 408, 514, 701/448, 301, 19, 23, 200, 214, 1, 431, 437, 701/444, 468, 96; 455/343.1, 343.2, 343.4, 455/343.6, 456.1, 238.1; 342/452, 451, 342/464, 107

See application file for complete search history.

(56) References Cited

U.S. PATENT DOCUMENTS 5,790,974 A * 8/1998 Tognazzini ................. 455/456.5
6,018,697 A * 1/2000 Morimoto et al. ............ 701/411
(Continued)

*Primary Examiner* — Mirza Alam
(74) *Attorney, Agent, or Firm* — Dority & Manning, P.A.

(57) ABSTRACT

Systems and methods are provided for determining the status of traffic lights through a mobile device and communicating the status to the user of the device. The mobile device detects its geographical location, direction and elevation. The mobile device also receives information related to traffic lights, such as location and type. The device calculates positional deviation from the device to the traffic light and generates one or more prompts in the form of audible or tactile cues that progressively guide the user to point the device at the traffic light. The mobile device detects the image and color of the traffic light and determines the illumination and sign status of the traffic light. Then the mobile device communicates the traffic light status to the user.

14 Claims, 8 Drawing Sheets

(52) U.S. Cl.
CPC ...... *H04M 1/72569* (2013.01); *G06K 9/00671* (2013.01); *G06K 9/3208* (2013.01); *G09B 21/003* (2013.01); *G09B 21/006* (2013.01); *B60W 2550/402* (2013.01)

(56) References Cited

U.S. PATENT DOCUMENTS

| | | | |
|---|---|---|---|
| 6,266,442 B1 | 7/2001 | Laumeyer et al. | |
| 6,449,384 B2 | 9/2002 | Laumeyer et al. | |
| 6,625,315 B2 | 9/2003 | Laumeyer et al. | |
| 7,060,981 B2 | 6/2006 | Retterath et al. | |
| 7,092,548 B2 | 8/2006 | Laumeyer et al. | |
| 7,444,003 B2 | 10/2008 | Laumeyer et al. | |
| 7,590,310 B2 | 9/2009 | Retterath et al. | |
| 8,350,758 B1* | 1/2013 | Parvizi et al. | 342/452 |
| 2002/0055817 A1* | 5/2002 | Chou | 701/207 |
| 2004/0218910 A1* | 11/2004 | Chang et al. | 386/98 |
| 2008/0139245 A1* | 6/2008 | Huh et al. | 455/556.2 |
| 2008/0297608 A1* | 12/2008 | Border et al. | 348/207.11 |
| 2010/0211307 A1* | 8/2010 | Geelen | 701/201 |
| 2010/0253541 A1* | 10/2010 | Seder et al. | 340/905 |
| 2011/0282542 A9* | 11/2011 | Nielsen et al. | 701/33 |
| 2012/0095646 A1* | 4/2012 | Ghazarian | 701/36 |

* cited by examiner

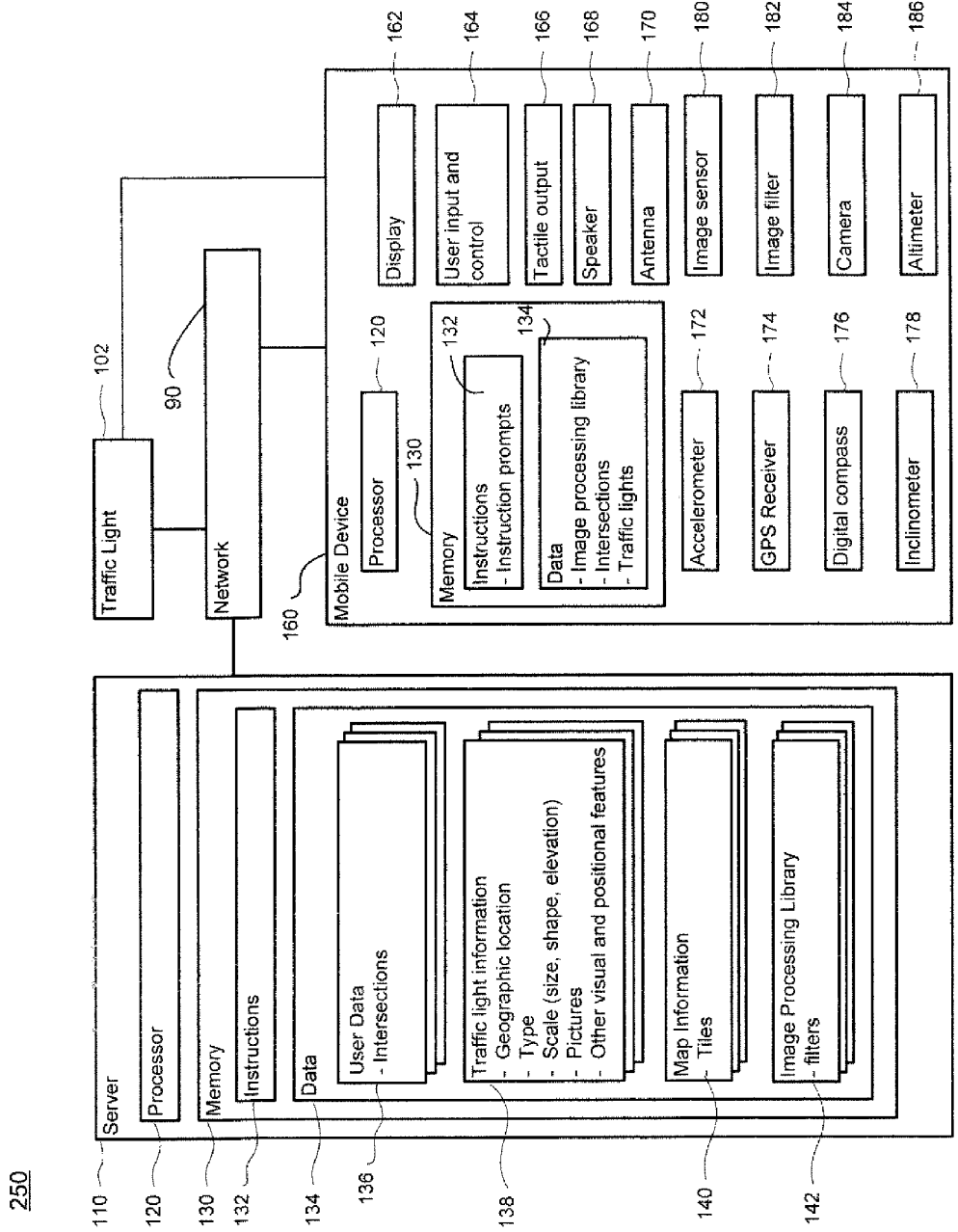

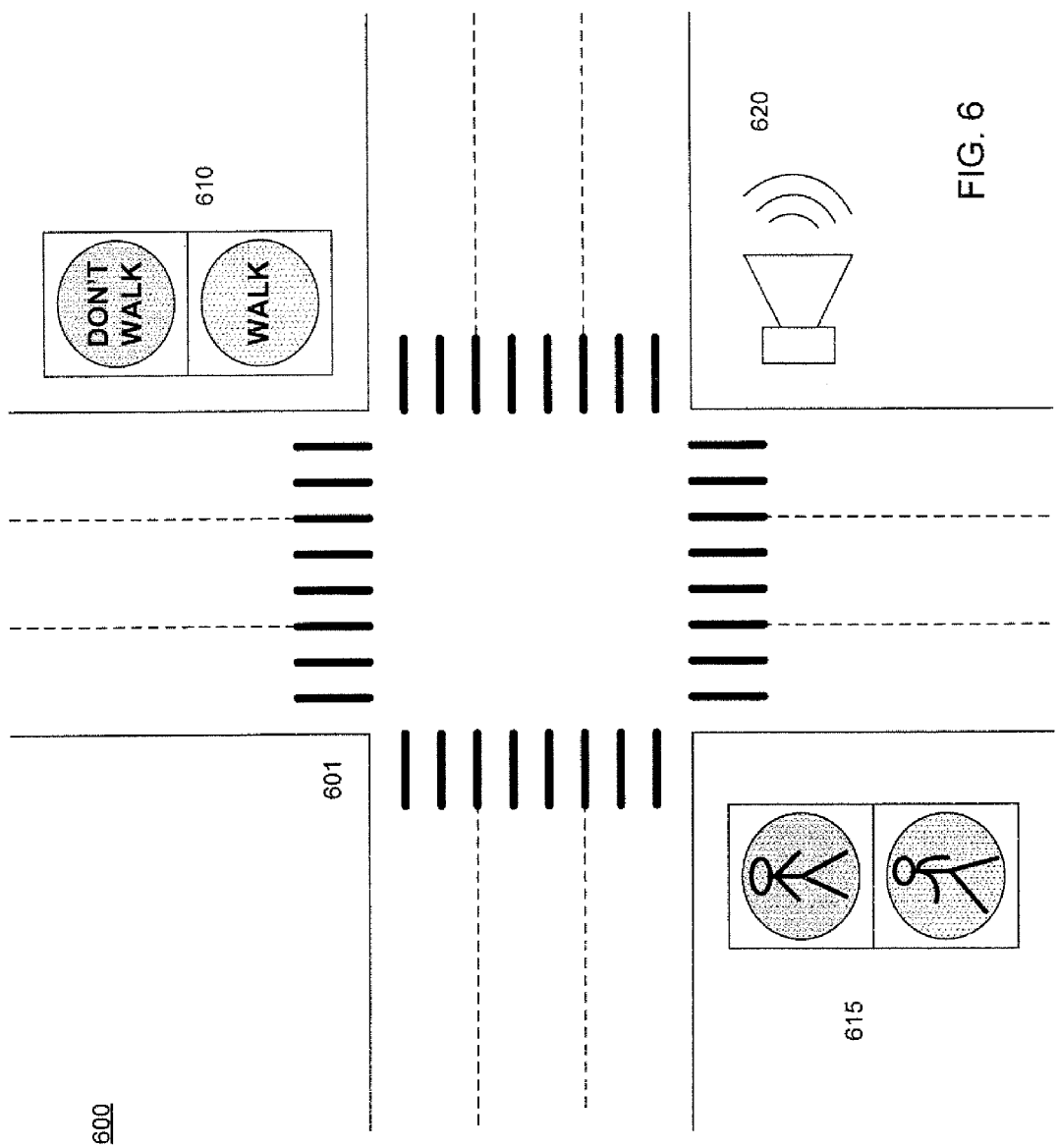

TRAFFIC LIGHT DETECTING SYSTEM AND METHOD

CROSS-REFERENCE TO RELATED APPLICATIONS

This application claims the benefit of the filing date of U.S. Provisional Patent Application No. 61/297,455 filed Jan. 22, 2010, the disclosure of which is hereby incorporated herein by reference.

BACKGROUND OF THE INVENTION

1. Field of the Invention

The present invention relates generally to traffic light detection systems and methods. More particularly, the present invention relates to identifying the state of traffic lights using a mobile device.

2. Description of Related Art

Blind travelers normally use the sound of traffic to judge whether a traffic light is green when deciding to cross a street. Building devices that can read traffic lights for one who cannot see is a technical challenge. Such electronic aids that can reliably announce the state of the traffic light typically require special-purpose hardware to be installed on traffic lights, and therefore such devices are often prohibitively expensive in the past.

Technologies that do not require the installation of special hardware on traffic lights have been used in custom built vehicles, e.g., the robot cars seen in the DARPA challenge that sense their environment when negotiating the city streets. However, such technologies typically rely on sensors. Such sensor-based solutions are likely to remain intractable on mainstream mobile devices. Consequently such solutions remain out of reach of the average consumer because of the high cost.

SUMMARY OF THE INVENTION

In one embodiment, a method of identifying a traffic light status is provided. The traffic light status comprises at least one of a color illumination status and a sign status of a traffic light. The method comprises receiving, at a user device, geolocation data associated with the traffic light and the user device. The user device geolocation data includes a location of the user device, and the traffic light geolocation data includes a location of the traffic light. The method also includes detecting an elevation and a direction of the user device; and determining the status of the traffic light with the user device based on the geolocation data associated with the traffic light and the user device, the elevation and the direction associated with the user device. The method also includes communicating the status to a user of the user device.

In accordance with another embodiment, a device for identifying a traffic light status is provided. The traffic light status comprises at least one of a color illumination status and a sign status of a traffic light. The device comprises a memory for storing information, including geolocation data associated with a traffic light and the device, direction and elevation information of the device. The device geolocation data includes a location of the device, and the traffic light geolocation data includes a location of the traffic light. The processor is coupled to the memory. The processor is configured to receive geolocation data associated with the traffic light and the device, and to detect an elevation and a direction associated with the device. The processor is also configured to determine the status of the traffic light with the device based on the received geolocation data, the detected elevation and the direction of the device. The processor is further configured to communicate the status to a user of the device.

In accordance with a further embodiment, a method for identifying a traffic light status with a server computer is provided. The traffic light status comprises at least one of a color illumination status and a sign status of a traffic light. The method comprises receiving, from a user device, geolocation data associated with the traffic light and the user device, elevation and direction data associated with the user device. The user device geolocation data includes a location of the user device, and the traffic light geolocation data includes a location of the traffic light. The method also comprises determining the status of the traffic light based on the received geolocation data, the elevation and direction data, and transmitting the status to the user device. Determining the status of the traffic light comprises generating one or more instructions to orient the user device to face the traffic light and transmitting the instructions to the user device. The method further comprises instructing the user device to communicate the status to the user.

In accordance with a further embodiment, a server apparatus is employed to identify a traffic light status. The traffic light status comprises at least one of a color illumination status and a sign status of a traffic light. The apparatus comprises a memory for storing information, including geolocation data associated with a traffic light and a user device, direction and elevation information of the user device. The user device geolocation data includes a location of the device, and the traffic light geolocation data includes a location of the traffic light. The processor is coupled to the memory. The processor is configured to receive geolocation data associated with the traffic light and the user device, and to detect an elevation and a direction associated with the user device. The processor is also configured to determine the status of the traffic light with the device based on the received geolocation data, the detected elevation and the direction of the device. Determining the status of the traffic light comprises generating one or more instructions to orient the user device to face the traffic light and transmitting the instructions to the user device. The processor is further configured to instruct the user device to communicate the status to the user.

In accordance with a further embodiment, a system is provided. The system comprises memory means for storing information data. The information data includes geolocation data associated with a traffic light and a user device, direction and elevation information of the user device. The user device geolocation data includes a location of the device, and the traffic light geolocation data includes a location of the traffic light. The system also includes means for detecting a location of a traffic light and a location of the user device, means for detecting a direction of the user device, means for detecting an elevation of the user device, and means for detecting a light signal of the traffic light. The system further includes means for capturing an image of the traffic light. The system also includes processor means for determining a status of the traffic light. The traffic light status comprises at least one of a color illumination status and a sign status of a traffic light. The processor means is also for generating one or more instructions to orient the user device to face the traffic light based on the geolocation data associated with the traffic light and the user device, the elevation and the direction of the user device. The system further includes means for outputting the traffic light status to a user of the user device.

It is to be appreciated that, unless explicitly stated to the contrary, any feature in any embodiment, alternative or example can be used in any other embodiment, alternative or example herein and hereafter.

In one example, determining the status of the traffic light comprises determining, from the geolocation data of the user device, if a current location of the user device is adjacent to an intersection. In the case where the current location is adjacent to the intersection, the method further comprises prompting the user to orient the user device to face the traffic light.

In one alternative, determining the status of the traffic light with the user device includes generating one or more instructions based on the geolocation data of the traffic light and the user device, the elevation and the direction of the user device. Orienting the user device to face the traffic light also includes providing the instructions to the user.

In another alternative, generating the one or more instructions to orient the user device includes generating a map for an area between the user device and the traffic light; and calculating deviations from the user device to the traffic light based on the map.

In a further alternative, the method comprises capturing one or more images of the traffic light and a surrounding area by an image capture device of the user device. In this case, determining the status of the traffic light is performed based on the captured images.

In another example, the method includes receiving information related to the traffic light, where the information comprises at least one of a size, a type and a timing sequence of the traffic light. In this situation, determining the status of the traffic light is performed based on the received information related to the traffic light.

In one alternative, the information related to the traffic light is received from a server computer.

In another alternative, the information related to the traffic light is generated based on the captured images.

In yet another example, determining the status of the traffic light with the user device comprises receiving light signals from a plurality of light sources, where one of the light sources comprises the traffic light. Determining the status of the traffic light also includes filtering light signals for frequency ranges emitted by the traffic light.

In another example, determining the status of the traffic light includes recognizing signs associated with the traffic light.

In yet another example, the method includes receiving audible information related to the status of the traffic light, and determining the status of the traffic light is further based on the audible information.

In one alternative, communicating the traffic light status to the user includes generating an audible output.

In another alternative, communicating the traffic light status to the user includes generating a tactile output.

In one example, the location of the traffic light and the location of the user device is detected by a geographical position device.

In another example, the direction associated with the user device is detected by a digital compass.

BRIEF DESCRIPTION OF THE DRAWINGS

FIG. 2B is a functional diagram in accordance with aspects of the invention.

FIG. 6 is an exemplary diagram in accordance with aspects of the invention.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

In accordance with aspects of the invention, a system determines the status of traffic lights through a mobile device and describes the status to the user of the device. The mobile device detects its geographical location, e.g., through a GPS system and determines if the user is at an intersection or is otherwise near a traffic light based on the knowledge from a map database. The mobile device also receives the geographical location and other information related to the traffic light at the intersection from a database storing traffic lights information. The direction and elevation of the device is calculated (e.g., by the mobile device). The device then generates one or more prompts such as in the form of audible or tactile cues that progressively guide the user until the device is precisely pointed at the light. The mobile device detects the image and color of the traffic light. The detected image and color are processed, and the status of the traffic light is determined. Then the mobile device communicates the traffic light status to the user.

Figure 1:
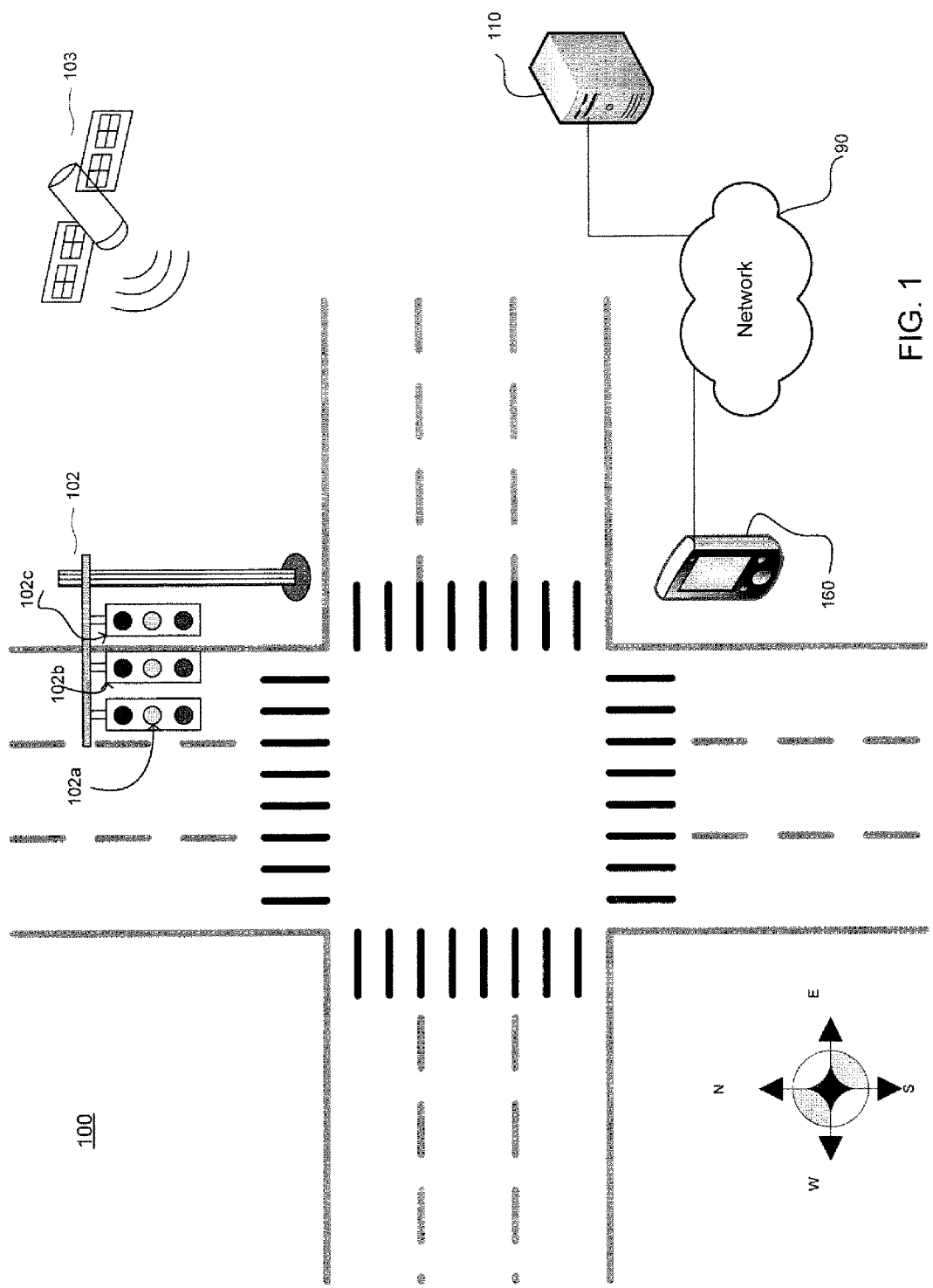
FIG. 1 is a pictorial diagram of a system in accordance with aspects of the invention.
Figure 2A:
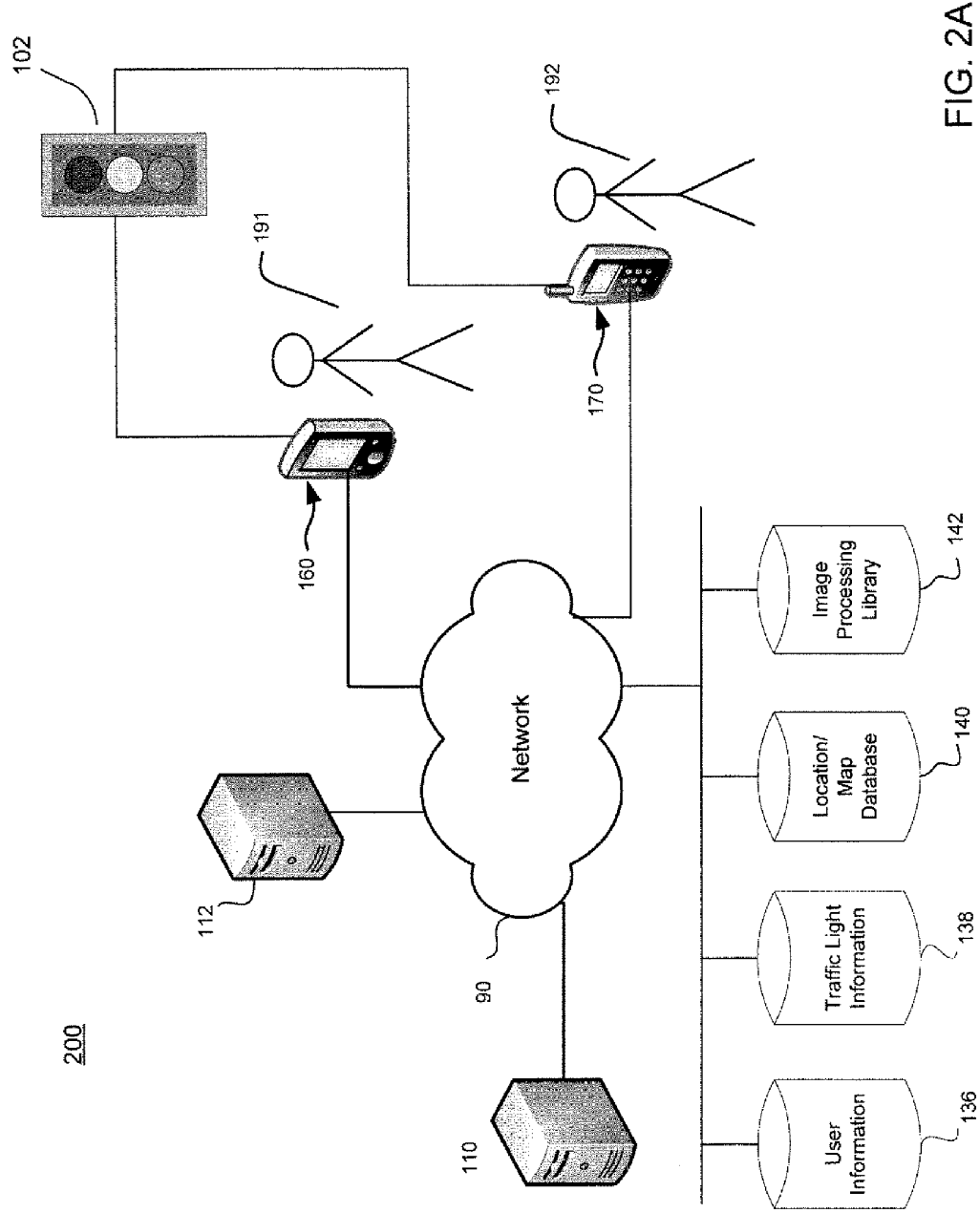
FIG. 2A is a pictorial diagram of a system in accordance with aspects of the invention.

As shown in FIG. 1, a system 100 in accordance with one aspect of the invention includes a server computer 110, a mobile device 160, a network 90, a traffic light 102 and a satellite 103. The mobile device 160 is connected through network 90 to the server 110. The mobile device may have a built-in GPS receiver to receive geolocation data from satellite 103. The traffic light 102 may have lights 102a-102c, each of which is dedicated to one corresponding street lane. The lights emitted by the traffic light 103 may be detected by the mobile device 160 and be further processed by the device or the server or both. As the configuration 200 of FIG. 2A shows, the network 90 may connect with one or more mobile devices 160 and 170, server computers 110 and 112 and a plurality of databases 136, 138, 140 and 142. Various types of data, such as user-related information, traffic light information, location/map data, image processing programs, may be stored in these databases and downloaded to the server or the mobile device. Various functions, such as image processing, may be performed on the mobile device 160 or on the server 110.

As illustrated in the functional diagram of FIG. 2B, the server computer contains a processor 120, memory 130 and other components typically present in general purpose computers. The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 2 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The server 110 may be at one node of network 90 and capable of directly and indirectly communicating with other nodes of the network. For example, server 110 may comprise a web server that is capable of communicating with user devices 160 and 170 via network 90 such that server 110 uses network 90 to transmit and display information to a user, such as person 191 or 192 of FIG. 1B, on display of client device 160. Server 110 may also comprise a plurality of computers that exchange information with different nodes of a network for the purpose of receiving, processing and transmitting data to the client devices. In this instance, the user devices will typically be at different nodes of the network than any of the computers comprising server 110.

Network 90, and intervening nodes between server 110 and user devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIG. 1-2, it should be appreciated that a typical system can include a large number of connected computers.

The user devices 160 and 170 may comprise mobile devices capable of wirelessly exchanging data with a server over a network such as the Internet. By way of example only, user device 170 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA).

Each user device may be configured with a processor 120, memory 130 and instructions 132. Each client device 160 or 170 may be a device intended for use by a person 191-192, and have all of the components normally used in connection with a mobile device such as a central processing unit (CPU), memory (e.g., RAM and internal hard drives) storing data and instructions such as a web browser, an electronic display 162 (e.g., a small LCD touch-screen or any other electrical device that is operable to display information), and user input 163 (e.g., keyboard, touch-screen and/or microphone), a network interface device (e.g., transceiver and antenna), as well as all of the components used for connecting these elements to one another. The output components on each user device may include a speaker 168 and a tactile output 166.

Memory 132 in each user device may store data 134 such as computer code that, in response to the detected light, orientation and position of the device, generates a set of prompts that continuously guide the user to orient the device to the traffic light. Data 134 may also include an image processing library 142 that consists of image recognition routines and appropriately tuned image filters to detect traffic lights. History of intersections and traffic lights data may be recorded in memory 132.

The user devices may also include one or more geographic position components to determine the geographic location and orientation of the device. For example, client device 160 may include a GPS 174 receiver to determine the device's latitude, longitude and/or altitude position. The geographic position components may also comprise software for determining the position of the device based on other signals received at the client device 160, such as signals received at the antenna from one or more cellular towers or WiFi access points. It may also include an accelerometer, gyroscope or other acceleration device 172 to determine the direction in which the device is oriented. By way of example only, the acceleration device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

Besides the GPS data receiver 174 and the accelerometer 172, each user device may also include other components that help to detect the position, orientation and elevation of the device. Such components include but are not limited to, a digital compass 176, an inclinometer 178 and an altimeter 186.

Each user device may include image and/or color capture components such as a camera 184, one or more image sensors 180 and one or more image filters 182.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Server 110 may store map-related information 140, at least a portion of which may be transmitted to a client device. For example and as shown in FIG. 2A, the server may store map tiles, where each tile comprises a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom. The map information is not limited to any particular format. For example, the images may comprise street maps, satellite images, or a combination of these, and may be stored as vectors (particularly with respect to street maps), bitmaps (particularly with respect to satellite images), or flat files.

The various map tiles are each associated with geographical locations, such that the server 110 and/or client device are capable of selecting, retrieving, transmitting, or displaying one or more tiles in response to receiving one or more geographical locations.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. Locations may be further translated from one reference system to another. For example, the user device 160 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

FIG. 2B illustrates that information related to traffic light may be stored in the server 110. Such information includes but is not limited to geographical location data, type and scale (e.g., size, shape and elevation) of the traffic light, pictures and other data related to the visual or positional features of the traffic light. User-specific or user-device specific data, such as history of the intersections that the user has crossed, may also be stored in the server.

In one embodiment, the databases storing different types of data may reside on the same server, as shown in the configuration 240 of FIG. 2B. For example, locations of traffic light may be integrated with the map data in server 110. In another embodiment, the databases may reside on different servers distributed through the network, as illustrated in FIG. 2A. Data related to user information may be stored in database 136. Traffic light related information may reside on database 138. Location/map data may be stored in database 140. Database 142 may contain calculation routines and modules for image processing.

Figure 3:
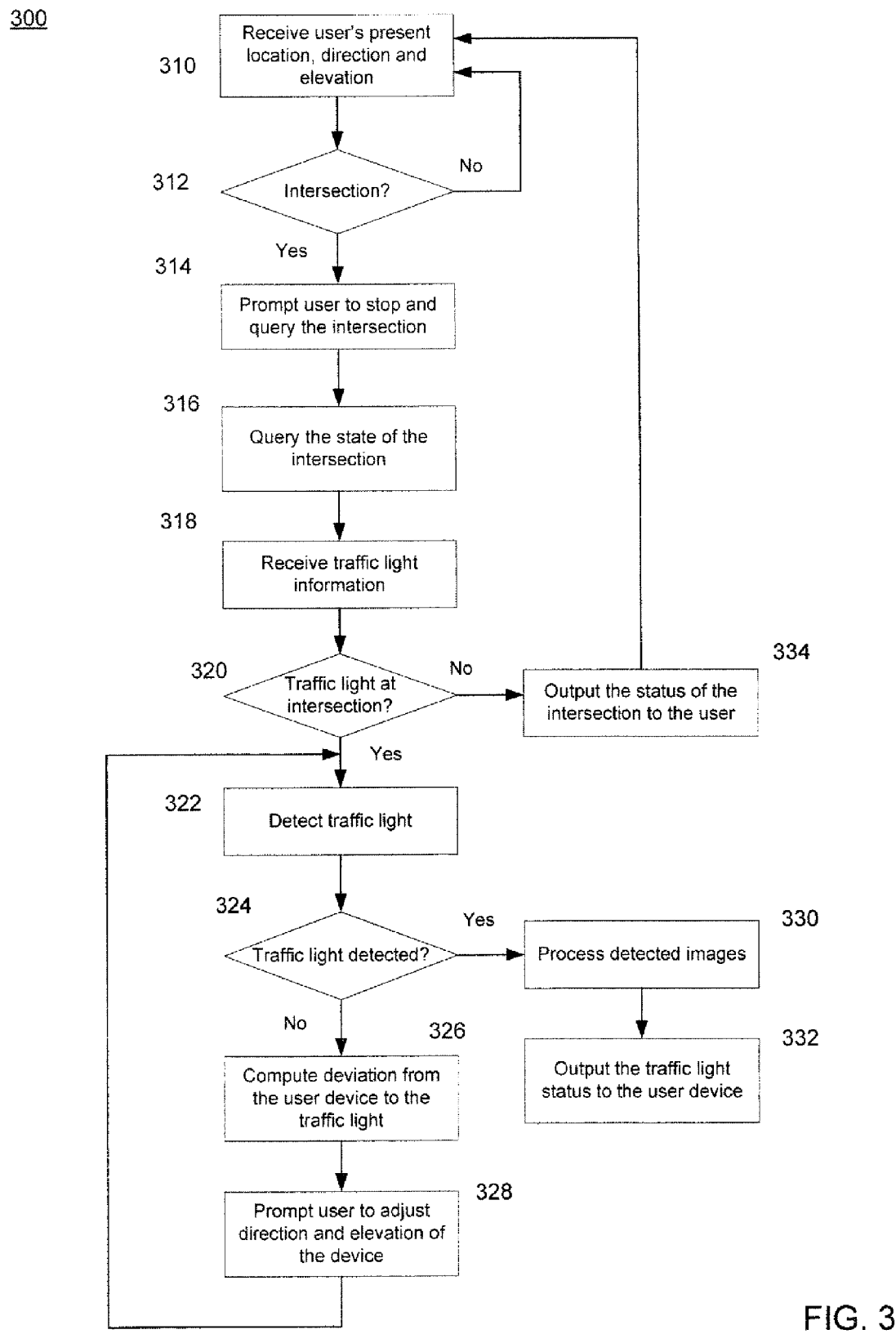
FIG. 3 is a flowchart in accordance with aspects of the invention.

FIG. 3 depicts a flowchart 300 of one embodiment of the invention. It will be understood that the operations do not have to be performed in the precise order described below. Rather, various steps can be handled in a different order or simultaneously.

In one example, as shown in block 310, a user holding a mobile device, such as device 160, may walk along a busy urban area. The mobile device desirably continuously receives GPS data and detects its current GPS coordinates. The device may also detect positioning data such as elevation and orientation of the device.

Based on the detected current location and the knowledge of map information from a map database, the mobile device is able to correctly determine if the user has come to an intersection in block 312. The map information may be retrieved from the map database by server 110 which sends the data to the mobile device. If the user's current location is at an intersection, the mobile device may prompt the user to stop and invoke the function of querying the state of the intersection in block 314. If the current location is not an intersection, the user device desirably gives no indication or prompt, and continues to detect the present location as the user continues walking.

In block 316, the user invokes the device to query the state of the intersection. The device makes a request to retrieve traffic light information from a server connected to the device. The device then receives traffic light related information such as the location, geometrical data (e.g., size, elevation, shape, etc.) and other data in block 318.

In an alternative, the mobile device may have prior knowledge of traffic light information, which comprises geolocation of traffic lights. The knowledge may be obtained from a server, such as server 110 or a database, such as database 138, on a real time basis, or may be downloaded to the device. Therefore, the mobile device may automatically determine that the user is at an intersection and there is a traffic light at the intersection based on the present location, map data and the traffic light information. In this scenario, the device may prompt the user of the existence of a traffic light.

If the device decides that there is no traffic light at this intersection in block 320, it may communicate to the user about the status of the intersection in block 334.

If the device decides that there is traffic light at this intersection, it may proceed to detect the traffic light in block 322. The device may detect light of varying wavelengths from the surrounding area and filter the received wavelengths according to the wavelengths emitted from the traffic light. The device may also capture an image of the traffic light and the adjacent area and analyze the image to find the targeted traffic light.

If the device can not detect the traffic light in block 324, the device may determine that the user is not pointing the device to the traffic light. It then, in block 326, calculates a vector of positional deviations from the device to the traffic light based on the detected orientation, elevation and position of the user device, as well as based on the scale and location data of the traffic light. The device may also incorporate the detected information of the surrounding area in the calculation.

The vector of deviations may comprise horizontal deviation and vertical deviation. For example, in scenario 500 in FIG. 5A, the user standing at intersection 501 and holding device 160 may initially point the device at the direction of building 510, and therefore the device deviates from the desired traffic light 102c by an angle α to the east. In this scenario, the device may prompt the user to move the device to the left by angle α. The device may also be configured to continuously prompt the user to move the device by a fraction of angle α and prompt the user to stop moving the device until the desired position is reached. If the user's move is larger than desired and points the device to the direction of light 102a instead of light 102c, the device may prompt the user to move to the east by an angle β. In another scenario 505 of FIG. 5B, the user device may be held too high by the user, and thus points to the building 515 over the traffic light 102 by an angle θ. The device may prompt the user to move the device downward by angle θ. The device may also be held too low and points to the lower portion of the traffic light pole so the device may ask the user to move the device upward by angle μ.

The information related to the traffic light, such as scale and elevation may be obtained by the user device from a server database storing such data. If the user device cannot obtain this information from such a database, it may acquire the information by capturing and processing an image of the traffic light.

Returning to FIG. 3, based on the detected deviation from the traffic light, the user device may generate one or more simple instructions prompting the user to move the device to minimize the deviation in block 328. For example, the instructions may be output to the user in the form of spoken message, such as "point up and to the left." The device continues the loop of detecting the traffic light, calculating the deviation and prompting the user to adjust the direction of the device until the device is precisely pointed at the light.

When the traffic light is detected, the device may filter and/or process the color images captured by an image capture component, such as a camera, in block 330. The device then determines the status of the traffic light accordingly. In block 332, the device informs the traffic light status to the user, for example, through a speaker in spoken language "green, pass."

The device may communicate to the user through non-audible methods, such as haptic output, the color of the traffic light and/or the status of the intersection. The device may be configured to provide the user with options to choose the type of communication.

Figure 4:
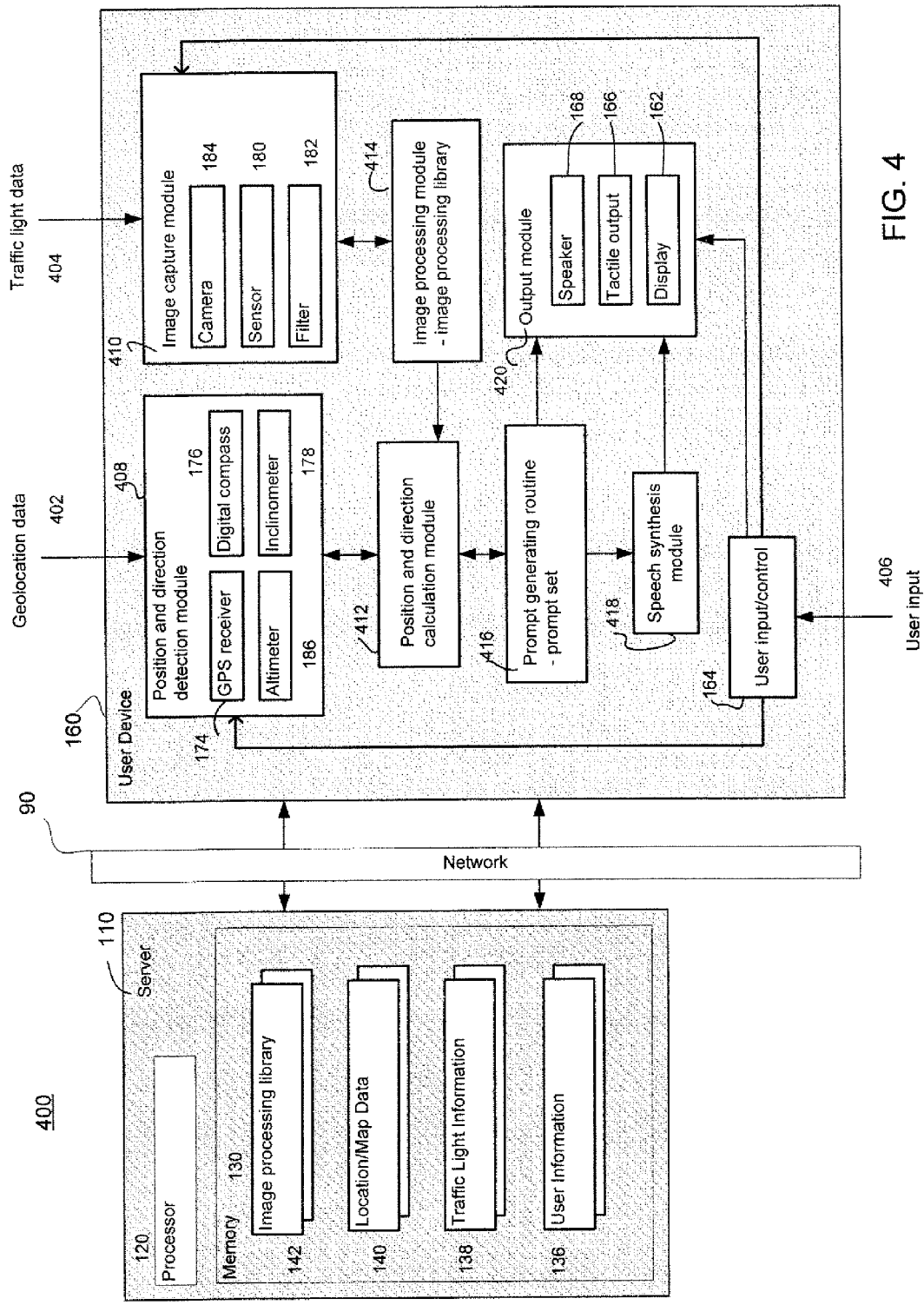
FIG. 4 is a functional diagram in accordance with aspects of the invention.

Aspects of the invention will now be described in greater detail with regard to FIG. 4, which illustrates a system diagram of the embodiments of the present invention. Here, user device 160 may contain a position and direction detection module 408 that receives geolocation data 402. The position and direction module 408 comprises components such as a GPS receiver 174, a digital compass 176, an altimeter 186 and an inclinometer 178.

The approximate location of the client's device may be found with a number of different technologies. For example, server 110 may receive geolocation information from the GPS receiver embedded in the user device. Thus the device may have access to latitude and longitude information. This information may be received by server 110 during connection with the user device in conformance with communication protocols. For example, the device may use a system such as Google Chrome or the browser of the Android operating system, each of which may be configured with user permission to send GPS information to trusted network sites. Server 110 may use this information to determine a location of the device. Because the accuracy of GPS determinations may depend on the quality of the device and external factors such as environment, the device may further transmit data indicative of accuracy. For example, the user device 160 may inform the server 110 that the transmitted latitude/longitude position is accurate within 50 meters, i.e., the device may be at any location within 50 meters of the transmitted position. The server may also assume a level of accuracy in the absence of such information.

In another example, server 110 may extrapolate geographic locations from one or more various types of information received from the user devices. For example, server 110 may receive location data from the user device indicating a potential location of the device. Location data may include an exact point, a set of points, a distance from a point, a range of points, a set of points, or arbitrary boundaries, for example streets, cities, zip codes, counties, states or the like. Server 110 may also determine a range of accuracy of the location data and use this information to determine a position or area in which the user device may be located.

Another location technology employs triangulation among multiple cell towers to estimate the device's position. A further location technology is IP geocoding. In this technique, a client device's IP address on a data network may be mapped to a physical location. As noted before, locations may be provided in any number of forms including street addresses, points of interest, or GPS coordinates of the user device.

The detected geolocation data, elevation, tilt and orientation may be transmitted to a position and direction calculation module 412 for further processing and calculations. The calculation module may be a set of computer code that resides on the memory of the user device.

Various calculation techniques may be used to estimate the deviation of the user device to the traffic light. For example, a vector map may be built for the area range approximately between the user's position to the traffic light's position. In another example, a raster grid overlay may be created where each cell in the grid overlay may be assigned an elevation data. Elevation data such as those of the user, of the traffic light pole and of the other clutters within the area are included in the map. The maps may help the device to find a path of view from the device to the traffic light, so the device may calculate the direction and magnitude with which the user device should be moved, and to further provide the instructions prompting the user to move the device to the desired position.

User device 160 may contain an image capture module 410 that comprises a camera 184, one or more sensors 180 and/or filters 182. This module may detect traffic light data 404. The sensor 180 may comprise single or multi element photo detector or monochrome/color detectors. The user device may also include a group of hardware bandpass filters 182 that only allow light at the desired wavelength to pass through. For example, the bandpass filters may only allow the emission frequencies of the traffic light LEDs to go through.

The user device may further comprise an image processing module 414. The image processing module 414 may include one or more image processing programs that perform the functions of image recognition and processing. For example, the camera 184 may capture a photo image of the traffic light and the surrounding area. Various color and image processing models may be applied to process the captured image.

In one example, color filtering may be performed by an appropriately tuned filter targeted for the red, yellow and/or green light(s). So regions of red, yellow and green light indicating an active traffic light may be identified in the image.

In another example, color screening may also be performed by converting the captured image of the traditional RGB (Red, Green, Blue) tri-color model into another representative model, such as the HIS (Hue, Saturation, and Intensity) color space, which is more related to human perception and less sensitive to illumination variation. By applying appropriate formulas or statistical models, HIS space may be used to screen out the pixels not satisfying the threshold ranges. A binary foreground map may thus be obtained by setting those pixels falling within the desired range as foreground point with a positive value and those pixels being screened out as background points having a value of zero.

Various screening techniques may be applied to reduce the impact of environmental variation, for example, by setting different illumination conditions for daytime and nighttime. Because traffic lights are active light sources emitting light in a particular direction, images may be purposefully toned down or otherwise made darker to enhance the contrast between different a traffic light and other light sources.

Morphology technologies, such as erosion and dilation may be used to mask the foreground map and thus to remove noise and broken regions to find the shape of the traffic light. Edge detection and shape characterization may also be performed to further process the image to detect the traffic lights.

Figure 5A:
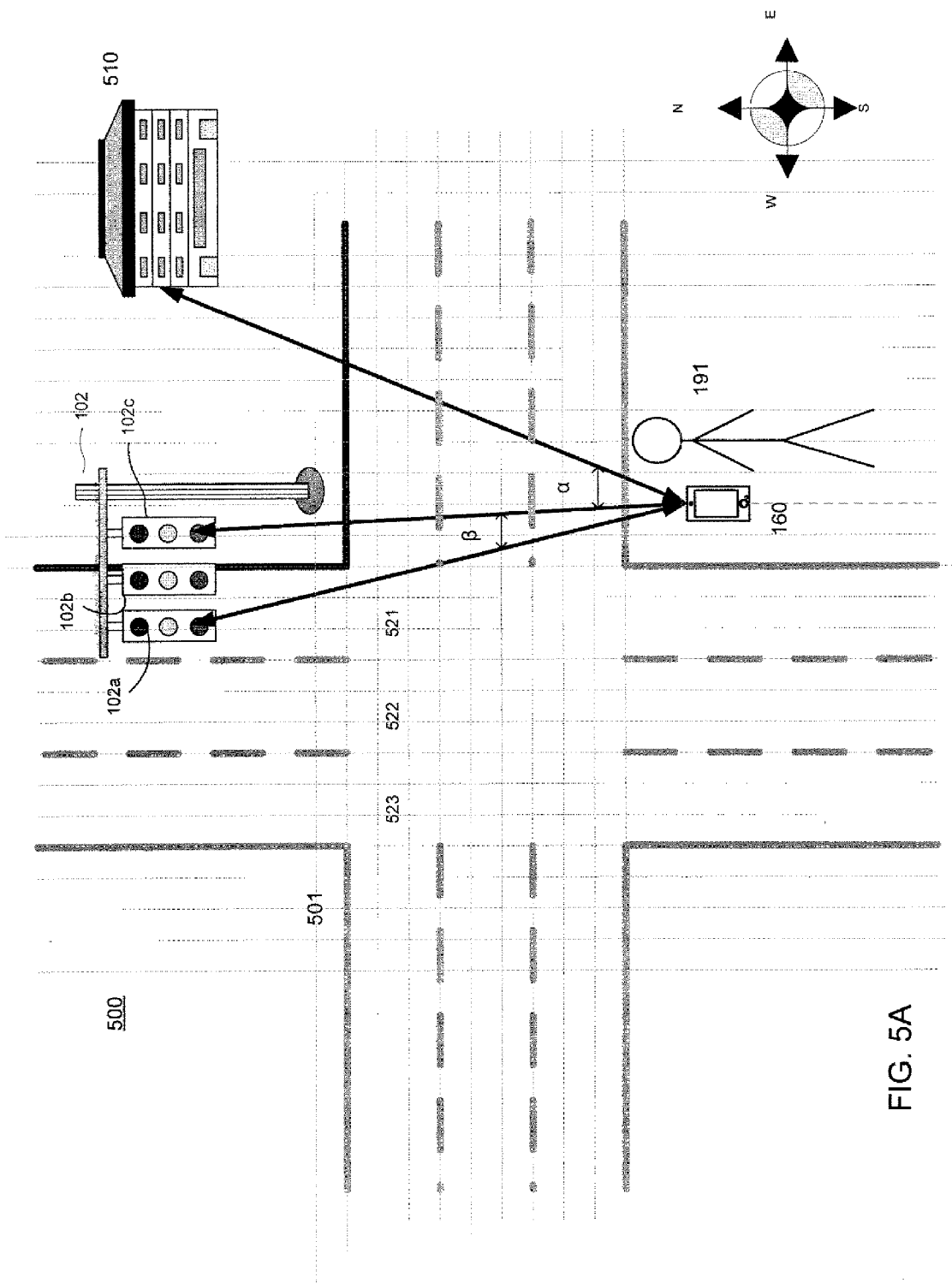
FIG. 5A is an exemplary diagram in accordance with aspects of the invention.
Figure 5B:
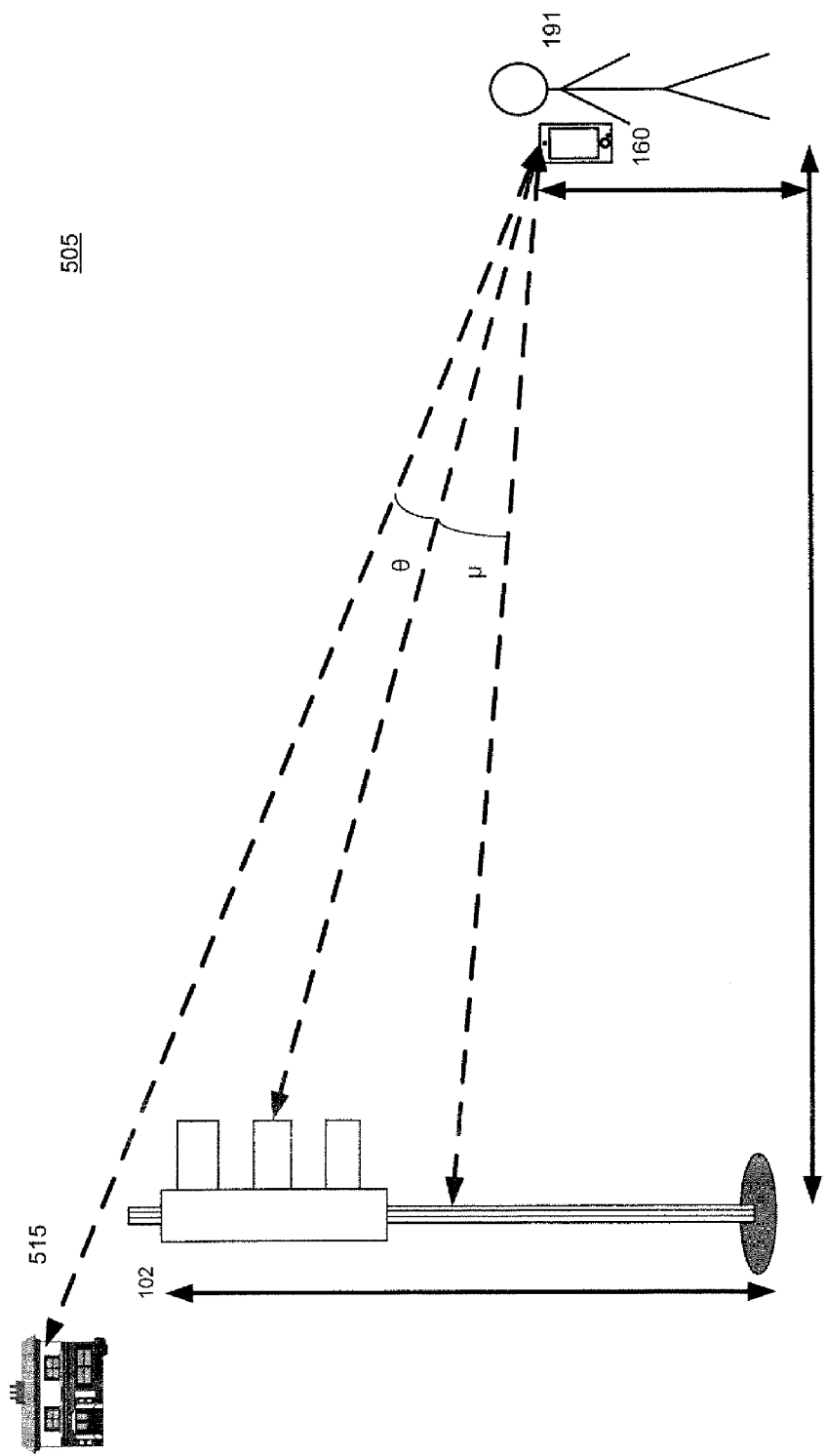
FIG. 5B is an exemplary diagram in accordance with aspects of the invention.

In one scenario, there may be lights for different lanes on one traffic light pole at an intersection. For example, as shown in FIG. 5A, traffic light 102 at intersection 501 includes three traffic lights 102a, 102b and 102c with each respectively dedicated to one of the three lanes 521-523. The green light of light 102a for lane 521 may have alternating signs of left-turn arrow and straight arrow, while lights 192-193 may bear no signs. Such references may be stored in a database, such as database 138, or in a server, such as server 110, containing traffic light information. In this situation, the device may make use of the reference to the traffic light to decide which light the device should detect, and prompt the user accordingly to point the device to the light 102c instead of the light 102a. If no such reference is available, the device may take an image of the traffic light, and analyze the image to find the appropriate traffic light.

In another scenario 600, as shown in FIG. 6, various types of pedestrian traffic lights may be present at an intersection. Some pedestrian lights may only perform pattern changing but not color changing. For example, the background color of pedestrian light 610 or 615 may stay the same when they change the signs from "DON'T WALK" to "WALK", or from a standing person to a walking person. In these situations, the image processing module 425 may include pattern and image recognition routines to discern the signs on the traffic light. For example, classified models of traffic lights may be used by the image processing module 425 for template matching. Existing classification and knowledge of the traffic lights and signs may be obtained from a database on the network or may be built into the image processing programs.

Many parameters may be taken into account to correctly identify the traffic light status, e.g., geometrical status (vertical and horizontal orientation, size and position) of the traffic light, signs on the light, timing sequence of the traffic light, and visual environmental cures etc. The image processing routines are also robust to the visual clutters from other sources, e.g., neon light from a nearby building. Features other than visual characteristics, such as sound data, may also be used to determine the light status. For instance, audible speech may state "walk" or "don't walk"; or chirping tones from a sound device 620 in FIG. 6 (such as a transducer or speaker) may be incorporated into the configuration.

Alternatively, neural networks may be employed for recognition and classification of the traffic lights and the related signs. In this way, large computations for template matching may be avoided. For example, the input image may not need to be transformed into another representative space such as Hough space or Fourier domain. The recognition result may depend only on the correlation between the network weights and the network topology itself.

The user device 160 may include a prompt generating module 416 that generates routines based on the deviation from the user device to the traffic light. A speech synthesis module 418 may convert the prompts into speech utterance and output the prompts to the user through the speaker 168. The device may also provide the user with options to choose the type of output, e.g., audio or tactile output.

It will be further understood that the sample values, types and configurations of data described and shown in the figures are for the purposes of illustration only. In that regard, systems and methods in accordance with aspects of the invention may include different traffic light patterns, visual or audio characteristics, environmental features, data values, data types and configurations, and different image and sound processing techniques. The systems and methods may be provided and received at different times (e.g., via different servers or databases) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any technology for determining the location of a traffic light or a mobile device may be employed in any configuration herein. Each way of communicating the location of a traffic light or the status of the light may be used in any configuration herein. Any mobile user device may be used with any of the configurations herein.

The invention claimed is:

1. A method of identifying a traffic light status, where the status comprises at least one of a color illumination status and a sign status of a traffic light, the method comprising:
   receiving, at a user device, geolocation data associated with the traffic light and the user device, the user device geolocation data including a location of the user device, and the traffic light geolocation data including a location of the traffic light;
   detecting an elevation and a direction of the user device;
   determining from the geolocation data of the user device if a current location is adjacent to an intersection;
   prompting a user to orient the user device to face the traffic light if the current location is adjacent to the intersection;
   generating, with the user device, one or more instructions to orient the user device to face the traffic light based on the geolocation data associated with the traffic light and the user device, and on the elevation, the direction and an orientation of the user device;
   capturing one or more images of the traffic light by an image capture device of the user device;
   performing with the user device image processing on the captured images to determine a status of the traffic light; and
   communicating the status to a user of the user device.

2. The method of claim 1, wherein generating the one or more instructions to orient the user device further comprises:
   generating a map for an area between the user device and the traffic light; and
   calculating deviations from the user device to the traffic light based on the map.

3. The method of claim 1, wherein determining the status of the traffic light with the user device further comprises:
   receiving light signals from a plurality of light sources, where one of the light sources comprises the traffic light; and
   filtering light signals for frequency ranges emitted by the traffic light.

4. The method of claim 1, further comprising:
   receiving information related to the traffic light, the information comprising at least one of a size, a type and a timing sequence of the traffic light; and
   wherein determining the status of the traffic light with the user device is performed based on the received information related to the traffic light.

5. The method of claim 1, wherein communicating the status of the traffic light to the user further comprises generating at least one of an audible output and a tactile output.

6. The method of claim 1, wherein determining the status of the traffic light further comprises at least one of recognizing signs associated with the traffic light, receiving audible information related to the status of the traffic light and determining the status of the traffic light is further based on the audible information.

7. The method of claim 1, wherein the location of the traffic light and the location of the user device are detected by a geographic position device, and the direction associated with the user device is detected by a digital compass.

8. A device for identifying a traffic light status of a traffic light, the device comprising:
   memory for storing geolocation data of the traffic light, geolocation data of the device, and direction information and elevation information for the device; and
   a processor coupled to the memory, the processor being configured to execute a set of instructions stored in the memory to:
      receive the geolocation data of the traffic light and the device;
      determine a current elevation and a current direction of the device;
      determine from the geolocation data of a user device if a current location is adjacent to an intersection;
      prompt a user to orient the user device to face the traffic light if the current location is adjacent to the intersection;
      determine with the device one or more instructions to orient the device to face the traffic light based on the received geolocation data, the current elevation, the current direction and an orientation of the device;
      receive light signals from a plurality of light sources, where one of the light sources comprises the traffic light;
      filter light signals for frequency ranges emitted by the traffic light to determine a status of the traffic light including at least one of a color illumination status and a sign status; and
      communicate the status to a user of the device.

9. The device of claim 8, wherein the processor is further configured to generate the instructions by:
   generating a map for an area between the user device and the traffic light; and
   calculating deviations from the device to the traffic light based on the map.

10. The device of claim 8, the device further including an imager, and the processor is further configured to:
    capture one or more images of the traffic light and a surrounding area with the imager;
    perform image processing on the captured images to determine the status of the traffic light.

11. The device of claim 8, wherein the processor is further configured to:
    receive information related to the traffic light, including at least one of a size, a type and a timing sequence of the traffic light,
    wherein the processor determines the status of the traffic light using the received information related to the traffic light.

12. The device of claim 8, wherein the processor is further configured to generate an audible output or a tactile output of the traffic light status.

13. The device of claim 8, wherein the processor determines the status of the traffic light by at least one of recognizing signs associated with the traffic light, and receiving audible information related to the status of the traffic light.

14. The device of claim 8, wherein the processor determines a location of the traffic light and a location of the device using a geographic position device, and determines the direction of the device with a digital compass.

* * * * *